United States Patent
Okada et al.

(10) Patent No.: US 7,416,694 B2
(45) Date of Patent: Aug. 26, 2008

(54) METHOD AND APPARATUS FOR PREHEATING RAW TIRE

(75) Inventors: Kazuto Okada, Kobe (JP); Hisashi Mitamura, Takasago (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 265 days.

(21) Appl. No.: 10/678,180

(22) Filed: Oct. 6, 2003

(65) Prior Publication Data

US 2004/0069391 A1  Apr. 15, 2004

(30) Foreign Application Priority Data

Oct. 10, 2002 (JP) .............................. 2002-297108

(51) Int. Cl.
*B29B 13/08* (2006.01)

(52) U.S. Cl. .................. 264/487; 219/635; 264/493; 264/326; 425/41; 425/50

(58) Field of Classification Search ................. 264/326, 264/487, 436, 492, 493, 345; 425/41, 50, 425/445, 446; 219/635
See application file for complete search history.

(56) References Cited

U.S. PATENT DOCUMENTS

| | | | |
|---|---|---|---|
| 1,379,595 A | 5/1921 | Post | |
| 1,566,500 A | 12/1925 | Northrup | |
| 2,451,992 A | 10/1948 | Grotenhuis | |
| 3,294,606 A | 12/1966 | Morgan et al. | |
| 4,456,806 A * | 6/1984 | Arimatsu | 219/710 |
| 5,630,958 A | 5/1997 | Stewart, Jr. et al. | |
| 6,551,085 B1 | 4/2003 | Mitamura et al. | |
| 6,655,940 B2 | 12/2003 | Mitamura et al. | |
| 6,818,872 B2 * | 11/2004 | Mitamura et al. | 219/635 |
| 7,078,660 B2 * | 7/2006 | Mitamura et al. | 219/635 |

FOREIGN PATENT DOCUMENTS

| | | |
|---|---|---|
| DE | 34 15967 A1 | 4/1984 |
| DE | 39 11082 A1 | 4/1989 |
| EP | 1 090 729 A2 | 9/2000 |
| GB | 2 200 085 A | 1/1987 |
| JP | 56-037145 | 9/1979 |
| JP | 56-37145 * | 4/1981 |
| JP | 01-178920 | 12/1987 |
| JP | 02-112911 | 10/1988 |
| JP | 07-096525 | 9/1993 |
| JP | 7-96525 * | 4/1995 |
| JP | 08-335496 | 6/1995 |
| JP | 2000-61963 | 8/1998 |
| JP | 2001-260136 | 7/2000 |
| JP | 2002-018857 | 7/2000 |
| JP | 2002-036244 | 7/2000 |
| WO | WO 99/03308 | 7/1998 |
| WO | WO 00/13883 | 9/1998 |

* cited by examiner

*Primary Examiner*—Mathieu D. Vargot
(74) *Attorney, Agent, or Firm*—Reed Smith LLP; Stanley P. Fisher, Esq.; Juan Carlos A. Marquez, Esq.

(57) ABSTRACT

The disclosed information describes a preheating method and apparatus for preheating raw tire including metal members embedded therein prior to vulcanization molding process, to heat whole part of the raw tire up to desirable temperature rapidly and certainly to complete vulcanization molding in a short time. The disclosed apparatus comprises a retaining means for retaining raw tire in a predetermined attitude in a releasable manner; a induction heating means for heating the metal members inductively by means of a high frequency magnetic field, the high frequency magnetic field being applied to raw tire retained by the retaining means; and a radiation heater for heating a rate-limiting portion radiatively, the temperature of the rate-limiting portion rising slowly under only induction heating for the metal members.

6 Claims, 11 Drawing Sheets

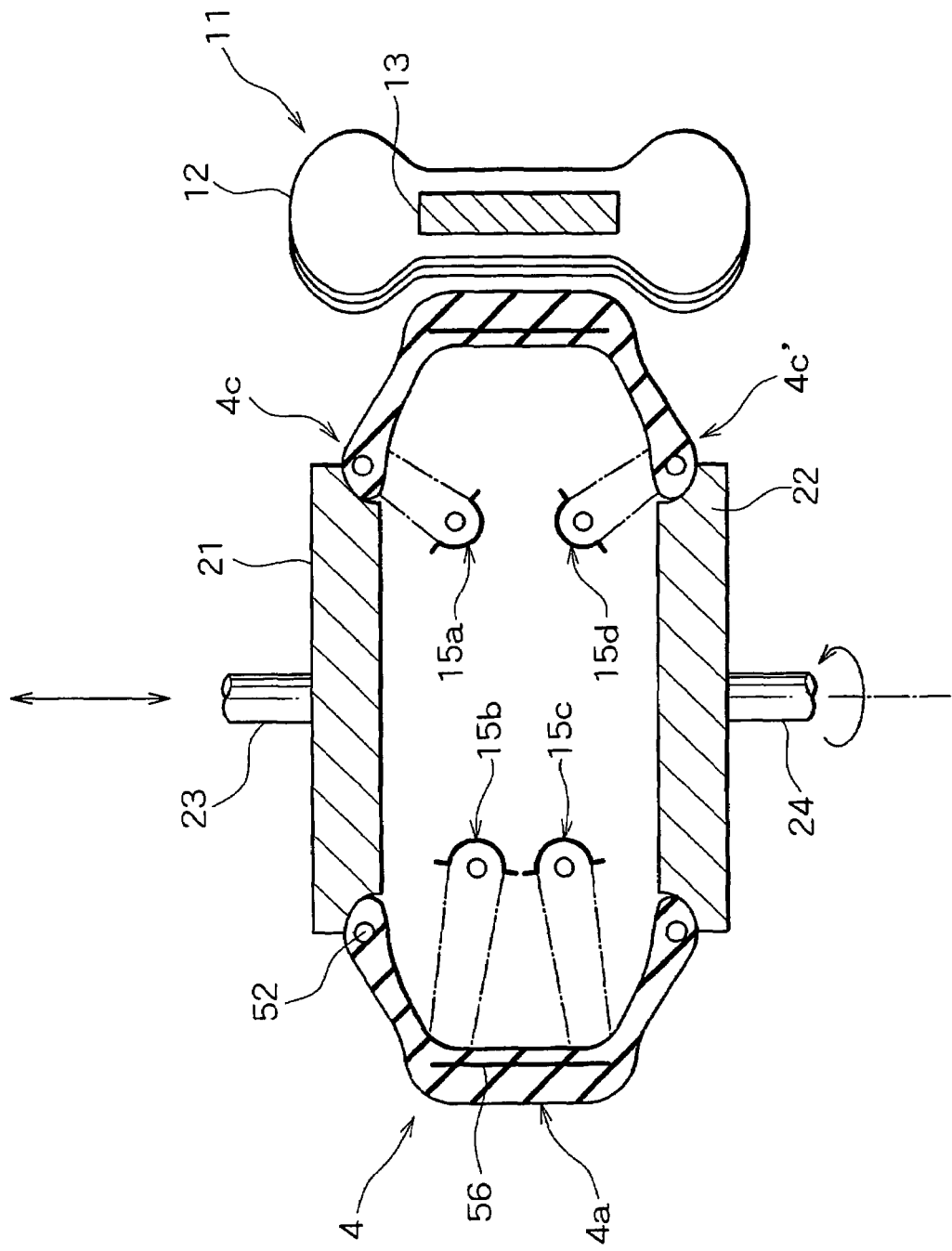

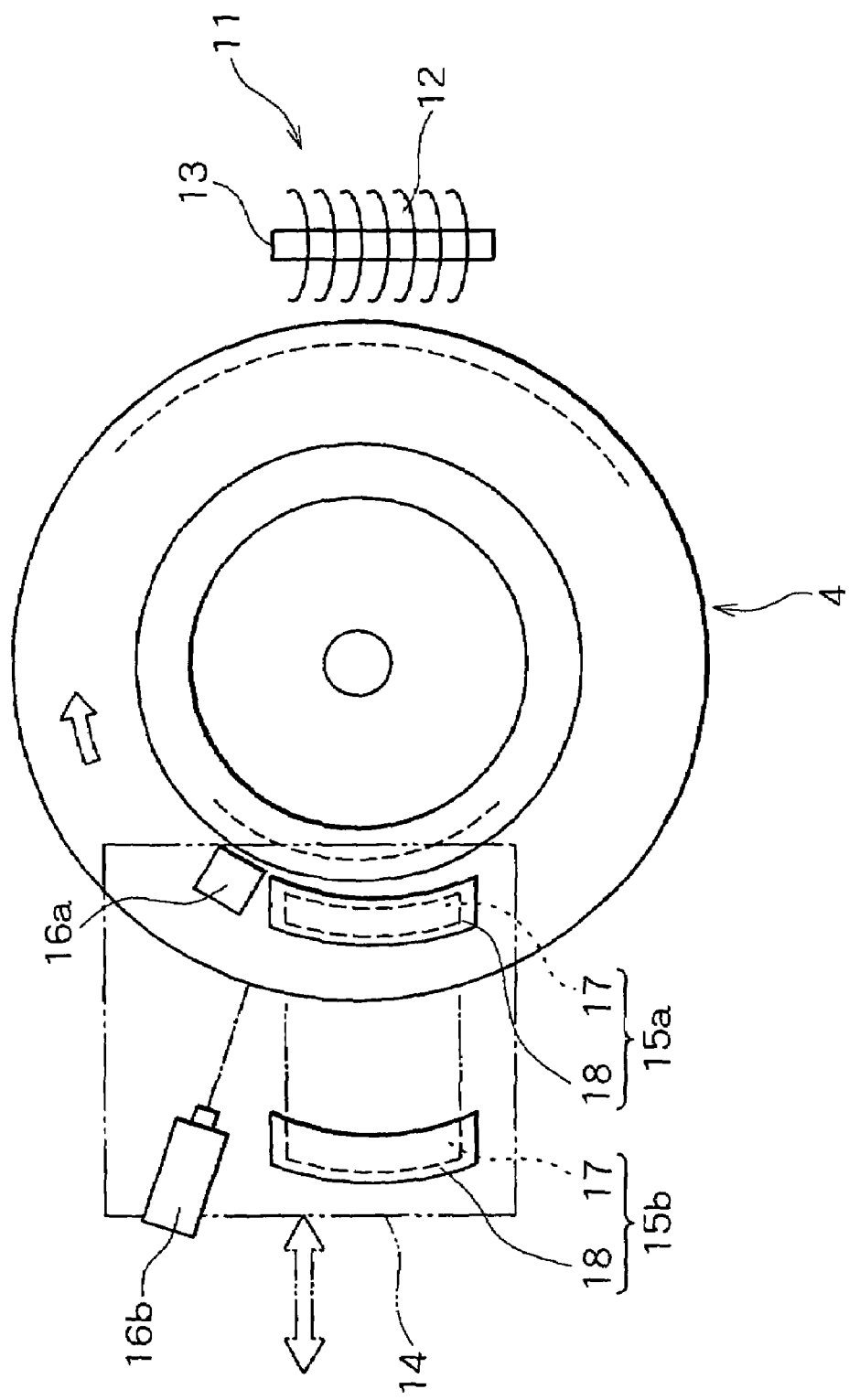

US 7,416,694 B2

METHOD AND APPARATUS FOR PREHEATING RAW TIRE

BACKGROUND OF THE INVENTION

1. Field of the Invention

The present invention relates to a preheating method and apparatus for preheating raw tire prior to vulcanization molding process.

2. Description of the Related Art

Raw tire is conventionally shaped by molding machine, and kept on rack of storage space, which is designated in a building etc. of vulcanizing facilities, in a room-temperature environment. The raw tire is subsequently gotten out of the rack based on production planning, and conveyed to vulcanizing machine. Bladder, which is inserted into the tire hole, is stretched to be brought into intimate contact with the inner wall surface of the tire by supplying the bladder with high-temperature and high-pressure heating medium after the raw tire, which is carried in, for example, a bladder-type vulcanizing machine, being loaded into a mold by means of clamping action. Then, the inner wall surface of the tire is heated and pushed in the direction of the mold through the bladder to form mold tire grooves on the tread portion of the tire. Further, vulcanization molding process may be completed in a short time by using a heated mold and a bladder contacted with high-temperature heating medium to heat the raw tire from the outside and the inside respectively, which results in early temperature rise up to the vulcanizing start temperature.

However, to keep raw tire for a long stretch of time in a room-temperature environment in accordance with the prior art above, which results in that the temperature of the raw tire becomes close to the room temperature of 25 degrees Celsius etc., requires temperature rise of the raw tire from the room temperature up to the vulcanizing start temperature in a vulcanization molding process of the tire in a vulcanizing machine. Although raw tire is conventionally heated from the outside and the inside by using mold or bladder respectively to complete vulcanization molding process in a short time as mentioned above, the temperature on the inner side and, more particularly the center on the inner side of notably fleshier part of the tread portion or the bead portion of the raw tire rises slowly while the temperature of the outer surface side of the raw tire rises in a short time, because raw tire is mainly composed of rubbers with low thermal conductivity. Therefore, the vulcanization molding process is required to be continued until the temperature on the inner side of the raw tire reaches the vulcanizing start temperature to carry out vulcanization even if the outer surface side of the raw tire has already finished vulcanization. On this account, the method of the prior art suffer from problem in that vulcanization molding may not be completed adequately in a short time.

In addition, microwave may be irradiated to raw tire while being stored as a preheating method of raw tire prior to vulcanization molding process. However, this method may not be a fundamental solution for completing the vulcanization molding process in a short time because microwave of the method may preheat (heat) the outer surface side of the raw tire mainly, but not the inner side, the temperature of the side rising most slowly while vulcanization molding. Furthermore, the rate of absorption of microwave energy is sensitive to a slight dispersion of composition of rubber members, the tendency of which becomes more pronounced as the heating temperature rises, and makes it difficult to heat raw tire evenly. Then, vulcanizing machines of every kind such as bladder-type, bladderless-type etc. suffer from this kind of problem, particularly notable for the bladder-type vulcanizing machine because bladder itself is composed of rubbers with low thermal conductivity.

SUMMARY OF THE INVENTION

Accordingly, an object of the present invention is to provide a raw tire preheating method and apparatus which makes it possible to complete vulcanization molding adequately in a short time.

To overcome the foregoing deficiencies, in a first aspect the present invention provides a raw tire preheating method for preheating raw tire including metal members embedded therein, characterized in that the method comprises preheating by using both induction heating for the metal members, and radiation heating for a rate-limiting portion, the temperature of the rate-limiting portion rising slowly under only the induction heating.

In accordance with the method above, regions, in which the metal members embedded, are heated from the inside by induction heating for the metal members. Also, the rate-limiting portion, the temperature of which rises slowly under only the induction heating, is heated from the surface side by radiation heating. By virtue of induction and radiation heating process above, each portion of the raw tire may be heated up to desirable temperature rapidly and certainly. Therefore, each portion of the raw tire may be heated up to desirable preheating temperature, and then the whole portion of the raw tire may be heated up to the vulcanizing start temperature in a short time in the vulcanization molding process, resulting in that the vulcanization molding process may be completed in a short time.

In a second aspect the present invention provides a raw tire preheating method for preheating raw tire including metal members embedded in a tread portion, characterized in that the method comprises preheating by using both induction heating for the metal members, and radiation heating for end portions of the tread portion. In accordance with this method, typically configured raw tire may be sufficiently preheated.

In a third aspect the present invention provides a raw tire preheating method for preheating raw tire including metal members embedded in a tread portion and a bead portion, characterized in that the method comprises preheating by using both induction heating for the metal members in the tread portion, and radiation heating for end portions of the tread portion and the bead portion. In accordance with this method, typically configured raw tire may be sufficiently preheated. Further, an apparatus for embodying the raw tire preheating method may be acquired inexpensively because it is not necessary to install an expensive apparatus for induction heating to heat the bead portion.

In a fourth aspect the present invention provides a raw tire preheating apparatus for preheating raw tire including metal members embedded therein, characterized in that the apparatus comprises a retaining means for retaining the raw tire in a predetermined attitude in a releasable manner; a induction heating means for heating the metal members inductively by means of a high frequency magnetic field, the high frequency magnetic field being applied to the raw tire retained by the retaining means; and a radiation heater for heating a rate-limiting portion radiatively, the temperature of the rate-limiting portion rising slowly under only induction heating for the metal members.

In accordance with the configuration above, regions, in which metal members embedded, are heated from the inside by induction heating for the metal members. Also, the rate-limiting portion, the temperature of which rises slowly under only the induction heating, is heated from the surface side by the radiation heating. By virtue of induction and radiation heating process above, each portion of the raw tire may be heated up to desirable temperature rapidly and certainly. Therefore, each portion of the raw tire may be heated up to desirable preheating temperature, and then the whole portion of the raw tire may be heated up to the vulcanizing start temperature in a short time in the vulcanization molding process, resulting in that the vulcanization molding process may be completed in a short time.

In a fifth aspect the present invention provides a raw tire preheating apparatus according to the fourth aspect above, characterized in that the metal members are embedded in a tread portion, while the radiation heater being arranged to heat end portions of the tread portion and a bead portion as the rate-limiting portion. In accordance with this configuration, typically configured raw tire may be sufficiently preheated. Further, an apparatus for embodying the raw tire preheating method may be acquired inexpensively because it is not necessary to install an expensive apparatus for induction heating to heat the bead portion.

In a sixth aspect the present invention also provides a raw tire preheating apparatus according to the fourth or fifth aspect above, characterized by comprising a tire rotation means for rotating raw tire retained by the retaining means circumferentially. In accordance with this apparatus, the whole portion of the raw tire may be preheated equally.

In a seventh aspect the present invention further provides a raw tire, characterized in that the raw tire is preheated by the raw tire preheating method according to any of the first to the third aspect above. The vulcanization molding process of the raw tire may be completed in a short time.

In a eighth aspect the present invention also provides a tire, characterized in that the tire is made by applying a vulcanization molding process to a raw tire preheated by the raw tire preheating method according to any of the first to the third aspect above.

BRIEF DESCRIPTION OF THE DRAWINGS

FIG. 10 is still another schematic diagram illustrating the arrangement condition of radiation heaters; and FIG. 11 is a further schematic diagram illustrating the arrangement condition of radiation heaters.

DESCRIPTION OF THE PREFERRED EMBODIMENTS

The present invention will be more fully understood from the following description of preferred embodiments when reference is made to the accompanying drawings from FIG. 1 to 11.

The raw tire preheating apparatus according to the present embodiments is installed in storing process, which is provided between molding process for molding raw tire and vulcanizing process for vulcanizing and molding the raw tire, to store the raw tire temporarily prior to the vulcanization molding based on production planning.

Figure 4:
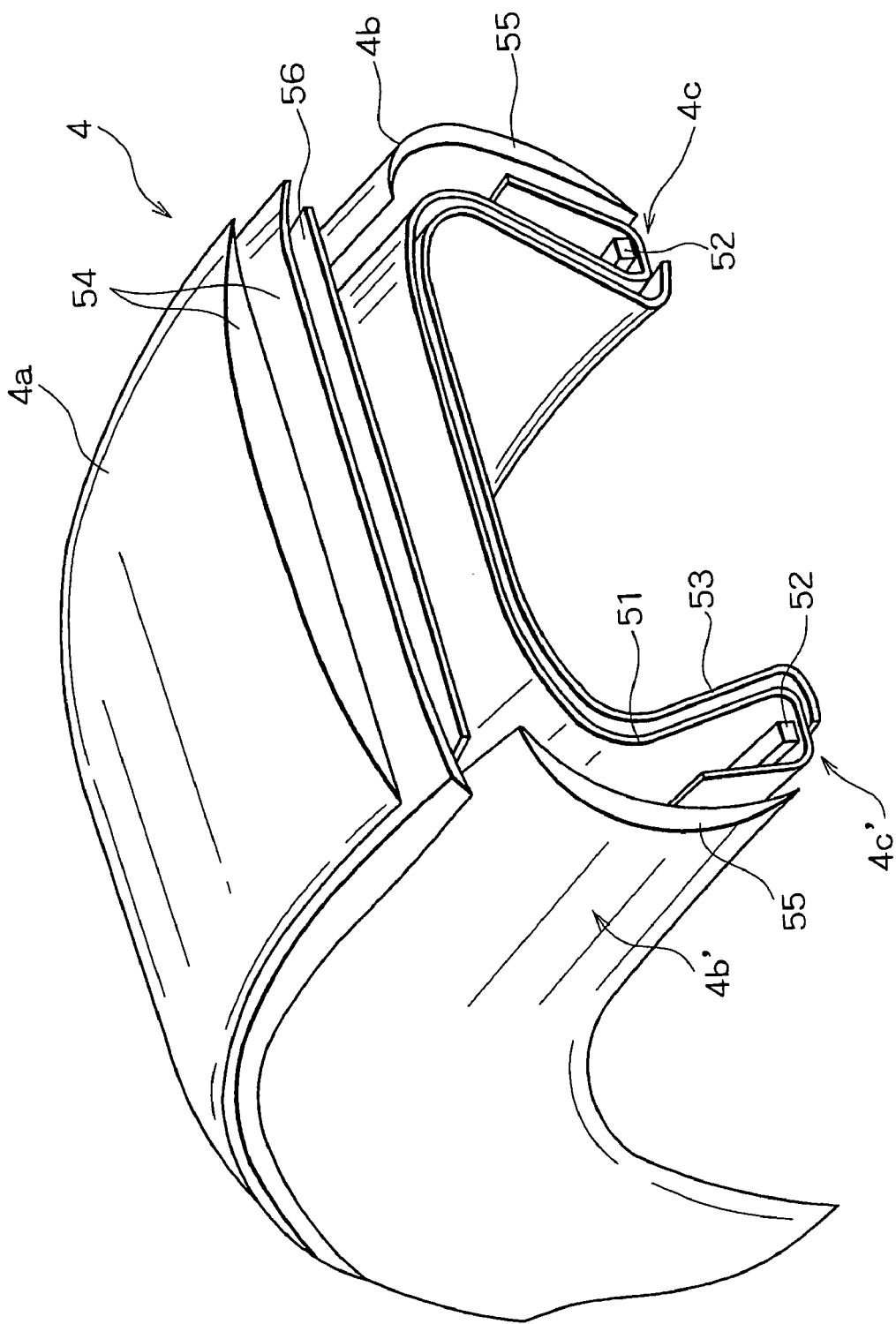
FIG. 4 is an exploded perspective view showing the relevant part of a raw tire.
Figure 5:
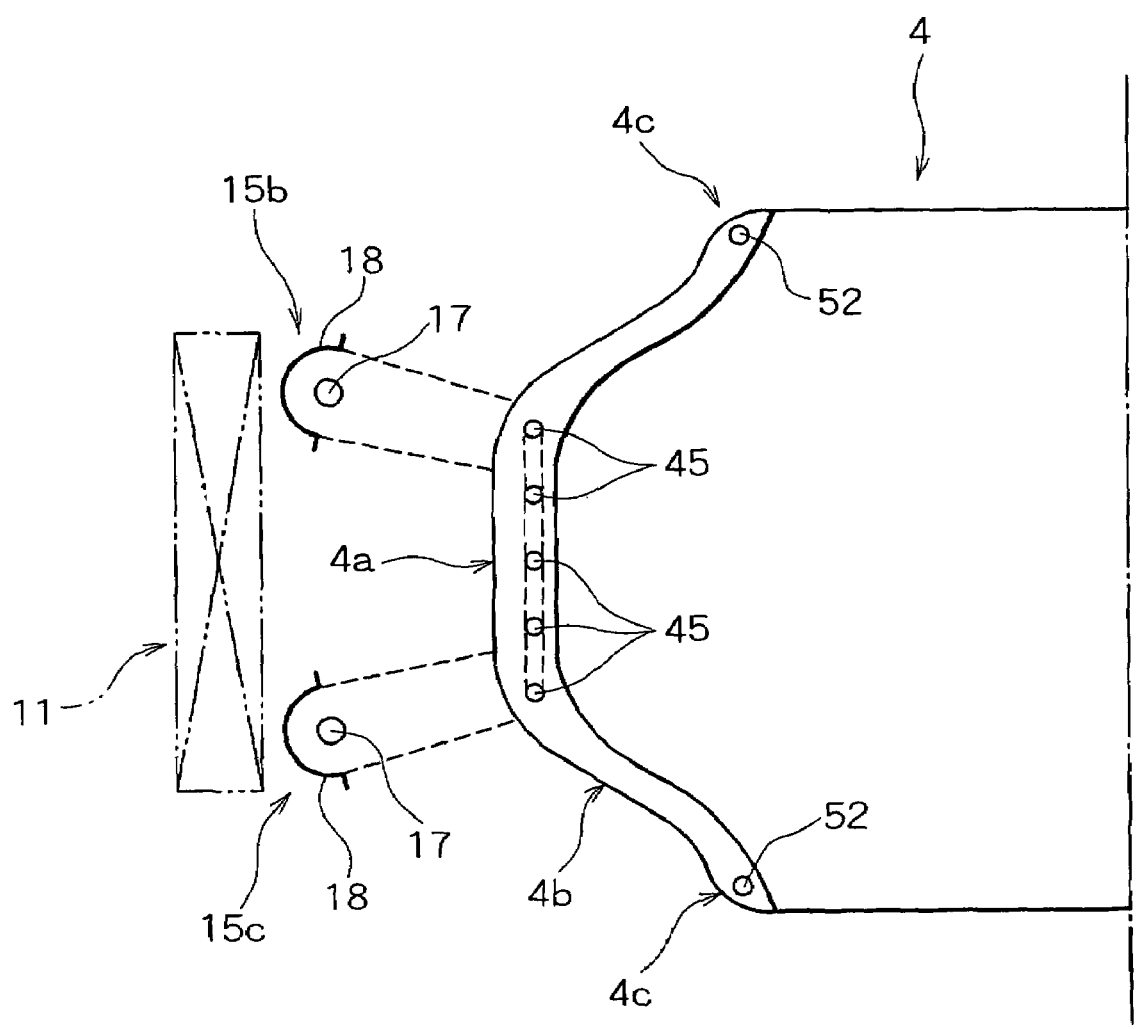
FIG. 5 is an illustration showing temperature measurement positions on a raw tire in a preheating test.

By the way, a raw tire 4 comprises a curcus assembly 51, the end portions of which are bended, a metal bead wire 52 provided at the bend of the curcus assembly 51, a rubber innerliner 53 attached to an inner peripheral surface of the curcus assembly 51, rubber tread members 54 and sidewall members 55 attached respectively to an outer peripheral surface and a side peripheral surface of the curcus assembly 51, and a metal belt member 56 arranged between the tread members 54 and the curcus assembly 51, as shown in FIG. 4. The raw tire 4, comprising the members above, forms a configuration, comprising a tread portion 4a to contact to the ground plane, sidewall portions 4b and 4b' placed at the both side of the tread portion 4a, and bead portions 4c and 4c' placed at the ends of the sidewall portions 4b and 4b'. The bead portion 4c at the upper side of the raw tire 4 in a horizontal attitude is hereinafter called the upper bead portion 4c, while 4c' of the lower side called the lower bead portion 4c'.

A raw tire preheating apparatus for preheating raw tire 4 above comprises a retaining means 1 for retaining the raw tire 4 in a horizontal attitude in a releasable manner, a tire rotation means 2 for rotating the raw tire 4 retained by the retaining means 1, a tire set means 3 for setting the raw tire 4 with the retaining means 1 on a preheating position, and an unillustrated pressurizing means for pressurizing inside the raw tire 4. The retaining means 1 includes an upper supporting plate 21 for supporting the upper bead portion 4c of the raw tire 4 and a lower supporting plate 22 for supporting the lower bead portion 4c' of the raw tire 4, the supporting plates 21 and 22 forming airtight spaces inside the raw tire 4 by holding the bead portions 4c and 4c' airtightly.

A supporting axis 23 is arranged extending upward at the center of the upper supporting plate 21 and connected to the tire set means 3 described above, while a rotational axis 24 is arranged extending downward at the center of the lower supporting plate 22 and connected to the tire rotation means 2 above. Also, a pressurizing means includes a fluid path and a pressurized fluid supplier for supplying pressurized fluid such as air into the fluid path. The pressurizing means supplies pressurized fluid into the space inside the raw tire 4 via the fluid path, and expands the raw tire 4 to be the predetermined shape by inner pressure to prevent the transformation of the raw tire 4 when preheating.

Further, the raw tire preheating apparatus comprises a radiation heating means 10 and an induction heating means 11, the heating means 10 and 11 being arranged respectively at either side of the raw tire 4 set in a horizontal attitude. The induction heating means 11 includes a coil 12 for heating inductively the tread portion 4a mainly and a core 13 which the coil 12 wound about, the outer surface of the coil 12 being formed to have a curvature that matches a segment of the tread portion 4a of the raw tire 4 while the coil 12 being connected to an induction heating power supply unit 31. The induction heating power supply unit 31 generates high frequency magnetic field by supplying induction power for the coil 12. Then, the induction heating means 11 above forms high frequency magnetic field around the raw tire 4 circumferentially by means of the coil 12 via the core 13 to heat inductively a steel belt 5, which is arranged on the tread portion 4a, effectively.

Figure 2:
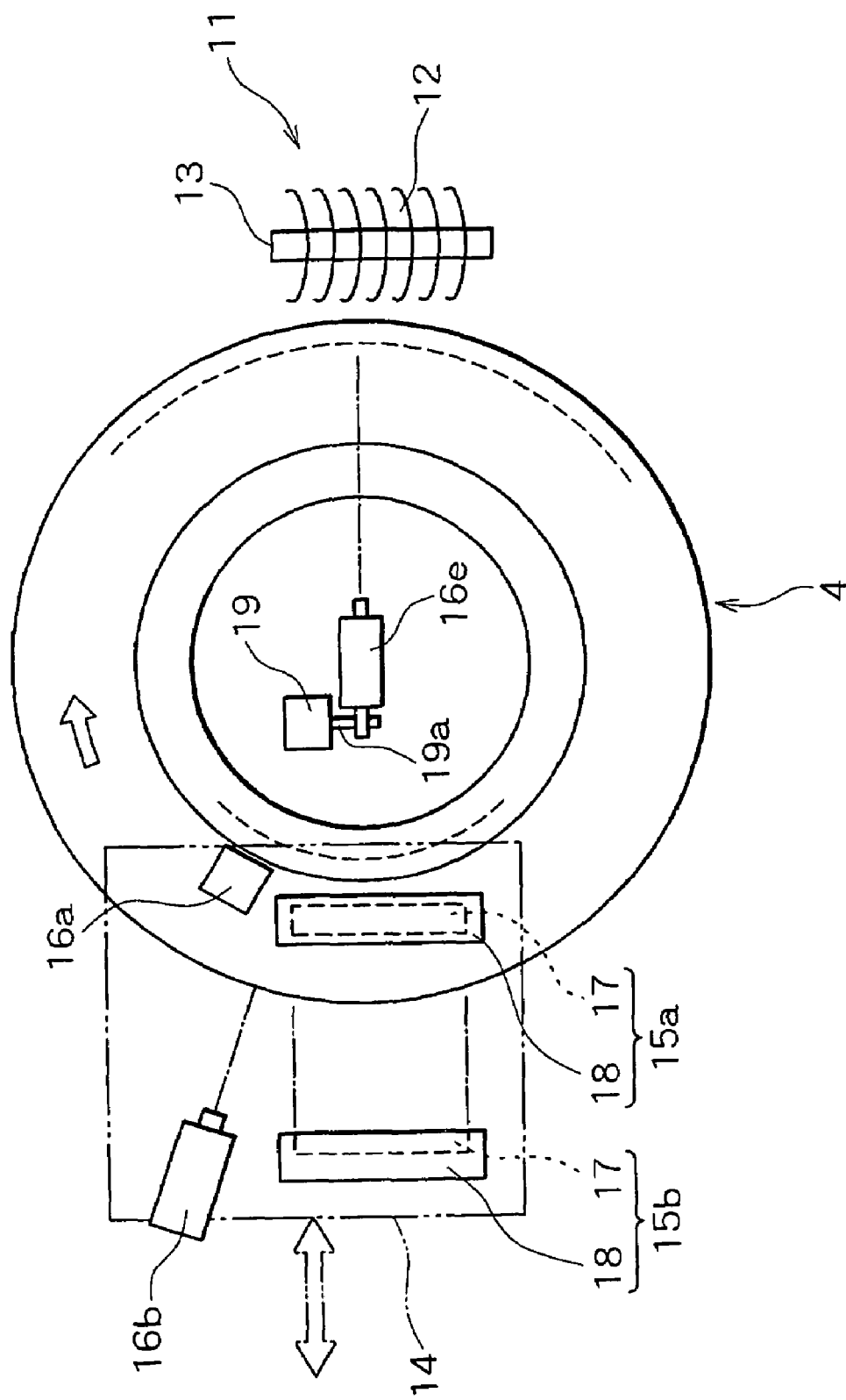
FIG. 2 is one schematic diagram illustrating the arrangement condition of radiation heaters.
Figure 3:
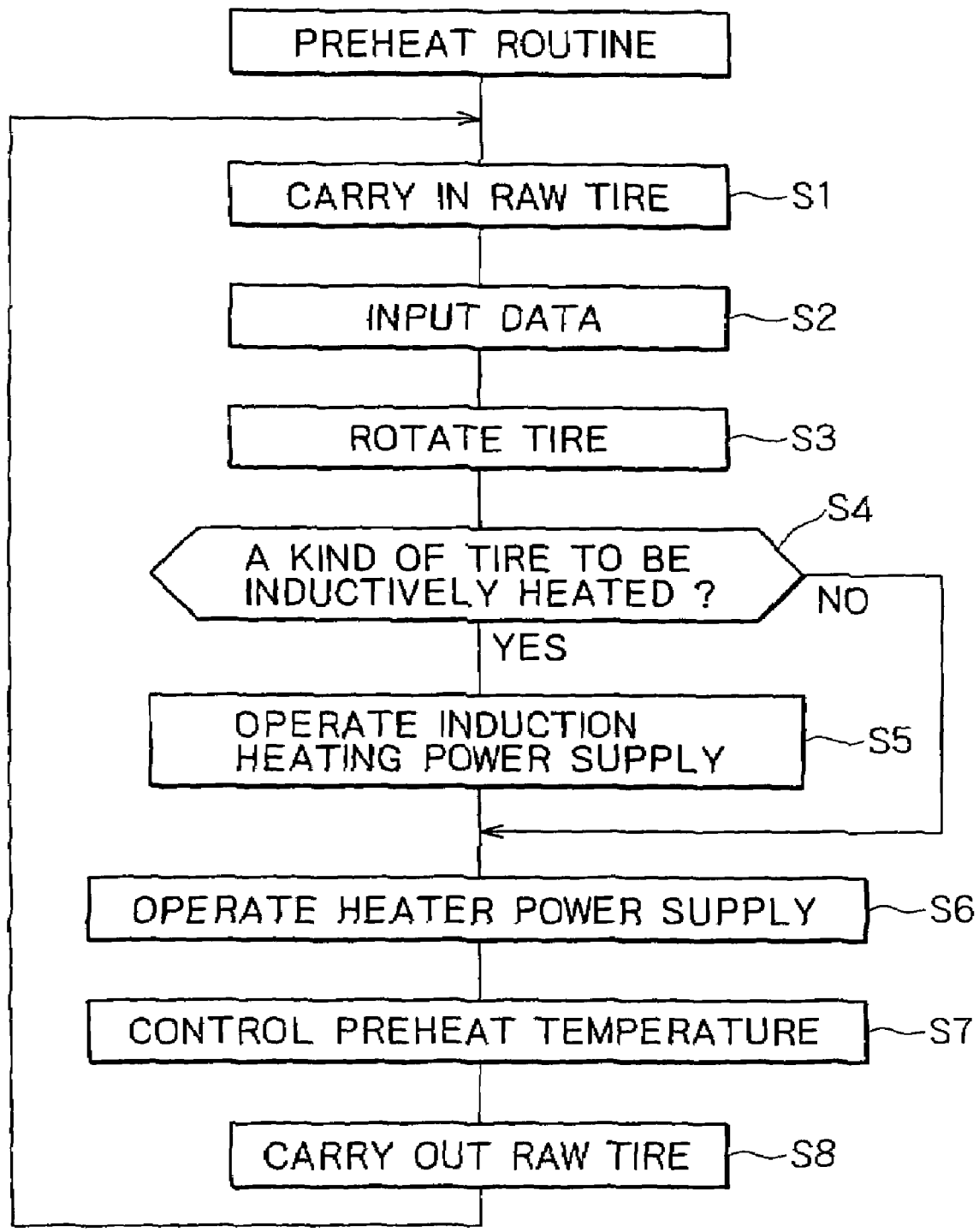
FIG. 3 is a flow chart showing a preheat routine.

On the other hand, the radiation heating means 10 comprises four radiation heaters 15a to 15d, corresponding respectively to the first to the fourth radiation heater, and a heater support 14 to support the four radiation heaters 15a to 15d in the predetermined attitude. And, each radiation heater 15a to 15d comprises a heater lamp 17 to generate high-temperature heat rays and a reflecting plate 18 to reflect heat rays radiated from the heater lamp 17 so that heat rays have directional characteristics, as shown in FIG. 2, wherein the heater lamp 17 is a halogen lamp with a small thermal capacity. The heater lamp 17 is formed to be straight columnar so that the axial direction of the heater lamp 17 is perpendicular to the radial direction of the raw tire 4. In addition, radiation heaters such as far-infrared ceramic heaters may be applied for the heater lamp 17.

Figure 1:
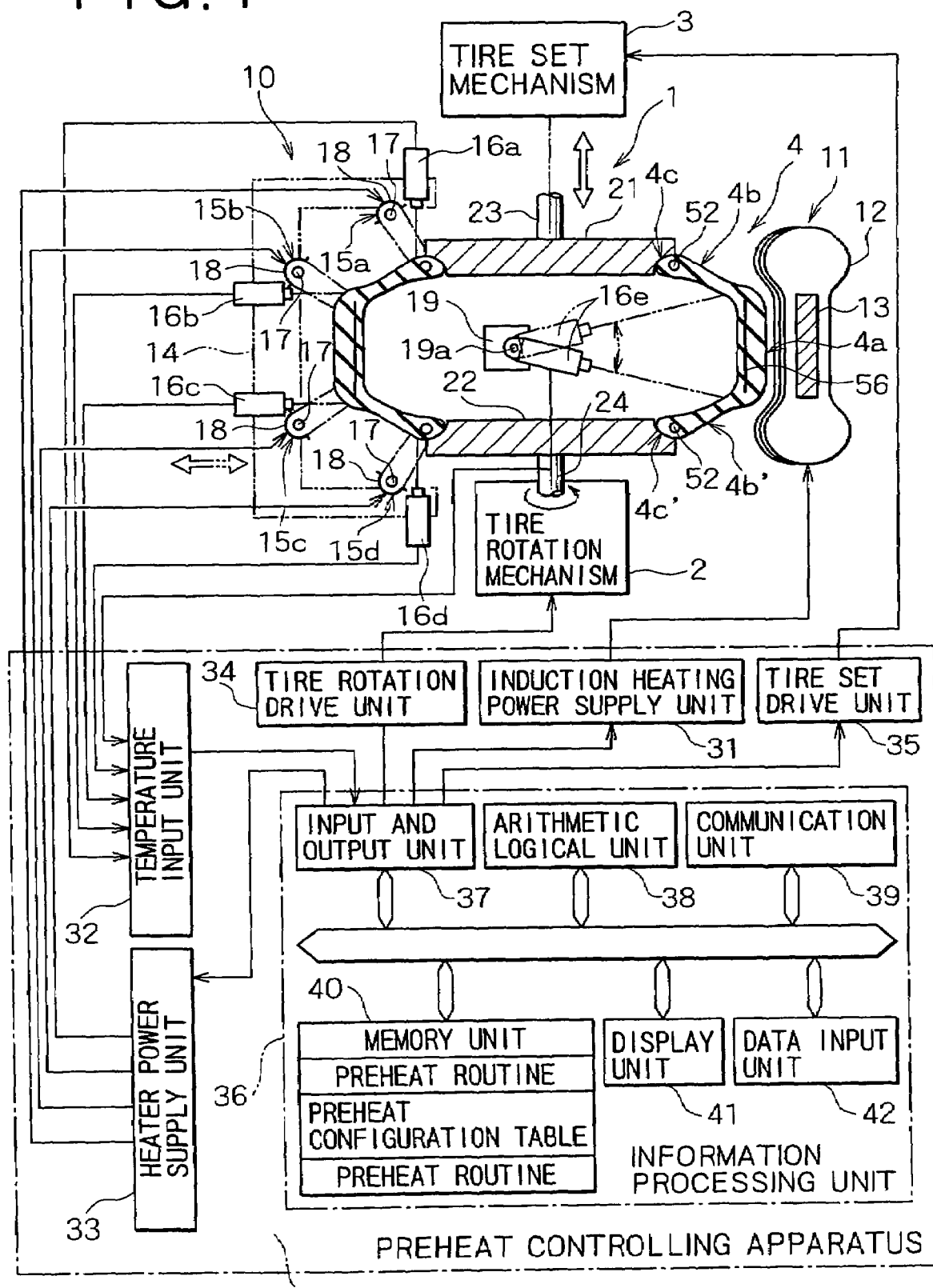
FIG. 1 is a schematic diagram showing the configuration of a raw tire preheating apparatus embodying the present invention.

The first radiation heater 15a is arranged at the corresponding height to the upper bead portion 4c of the raw tire 4, as shown in FIG. 1, and held in an attitude to apply heat rays intensively on the upper bead portion 4c so that the upper bead portion 4c is heated. The second radiation heater 15b is arranged at the corresponding height to the upper end of the tread portion 4a, and held in an attitude to apply heat rays intensively on the upper end of the tread portion 4a so that the upper end is heated. The third radiation heater 15c is arranged at the corresponding height to the lower end of the tread portion 4a, and held in an attitude to apply heat rays intensively on the lower end of the tread portion 4a so that the lower end is heated. The fourth radiation heater 15d is arranged at the corresponding height to the lower bead portion 4c' of the raw tire 4, and held in an attitude to apply heat rays intensively on the lower bead portion 4c' so that the lower bead portion 4c' is heated.

Each radiation heater 15a to 15d above is held at each height in each predetermined attitude respectively as mentioned above by the heater support 14, the heater support 14 being connected to an unillustrated moving means. The moving means is configured so that the heater support 14 is movable toward and away from the raw tire 4 horizontally. Then, the moving means functions so that the heater support 14 is moved away to the farthest position from the raw tire 4 to install/uninstall the raw tire 4 to/from the preheating position, while moved toward the preheating position, where heater rays from each radiation heater 15a to 15d may be applied on the raw tire 4, to preheat the raw tire 4.

Further, the raw tire preheating apparatus comprises five temperature sensors 16a to 16e, corresponding respectively to the first to the fifth temperature sensor, for detecting preheating temperature, which being configured to detect surface temperature of the raw tire 4 by non-contact infrared method. The first temperature sensor 16a is arranged at a height in an attitude to detect preheating temperature of the upper bead portion 4c. The second temperature sensor 16b is arranged at a height in an attitude to detect preheating temperature of the upper end of the tread portion 4a. The third temperature sensor 16c is arranged at a height in an attitude to detect preheating temperature of the lower end of the tread portion 4a. The fourth temperature sensor 16d is arranged at a height in an attitude to detect preheating temperature of the lower bead portion 4c'. Then, the temperature sensors 16a to 16d are fixed to the heater support 14 accompanied with the first to the fourth radiation heaters 15a to 15d so that the sensors are positioned directly downstream the radiation heaters.

The fifth temperature sensor 16e is separately arranged between the upper supporting plate 21 and the lower supporting plate 22 so as to be positioned in a space inside the raw tire 4. Then, a reciprocal axis 19a of an adjustable support apparatus 19 is connected to the end portion of the fifth temperature sensor 16e, the adjustable support apparatus 19 comprising drive motors such as stepping motors, motors with encoders, etc. so as to detect reciprocal angle and to pivot the reciprocal axis 19a in both forward and reverse direction. Preheating temperature of region between the upper end and the lower end of the tread portion 4a may be detected by adjusting the fifth temperature sensor 16e upward and downward around the reciprocal axis 19a of the adjustable support apparatus 19. In addition, the adjustable support apparatus 19 may arrange limit switches at both upper limit position and lower limit position in reciprocal direction to reverse the reciprocal direction when each limit switch is turned ON.

The first to the fifth temperature sensors 16a to 16e are connected to a temperature input unit 32 comprised in a preheat controlling apparatus 30. The preheat controlling apparatus 30 comprises the induction heating power supply unit 31 mentioned above, a heater power supply 33, a tire rotation drive unit 34, a tire set drive unit 35, and a information processing unit 36 as well as the temperature input unit 32. The temperature input unit 32 comprises functions for taking in preheating temperature signals indicated by voltage value or current value output from the first to the fifth temperature sensors 16a to 16e to convert the signals to digital value, and for outputting the digitized preheating temperature signals selectively by means of selection signals from the information processing unit 36.

Furthermore, the induction heating power supply unit 31 is connected electrically to the coil 12 of the induction heating means 11, comprising a function for generating high frequency magnetic field from the coil 12 by supplying induction power for the coil 12 based on induction heating signals from the information processing unit 36. The heater power supply unit 33 is connected electrically to the first to the fourth radiation heater 15a to 15d, comprising a function for generating heat rays of any heat capacity from each heater 15a to 15d by supplying heating power for each heater based on radiation heating signals from the information processing unit 36. The tire rotation drive unit 34 is connected electrically to the tire rotation means 2, comprising a function for operating the tire rotation means 2 based on rotating signals from the information processing unit 36 to rotate the raw tire 4. The tire set drive unit 35 is connected electrically to the tire set means 3, comprising a function for operating the tire set means 3 based on tire setting signals to install/uninstall the raw tire 4.

Each of the foregoing units 31 to 35 is connected to the information processing unit 36, the information processing unit 36 consisting of information processing apparatus such as microcomputers, personal computers, etc. including a input and output unit 37, a arithmetic logical unit 38, a communication unit 39, a memory unit 40, a display unit 41, and a data input unit 42. The input and output unit 37 is connected to each of the foregoing units 31 to 35 so as to transmit/receive every kind of signals to/from each of the units 31 to 35. The memory unit 40 stores every kind of data such as program data, for example preheat routine etc., process data, for example preheat configuration table etc, wherein the preheat routine is a program for carry-in/out processing and preheat processing for the raw tire 4, while the preheat configuration table is a tabular form for illustrating preheat processing for the raw tire 4, the first preheat configuration for preheating by radiation heating and induction heating and the second preheat configuration for preheating only by radiation heating being corresponded respectively to category data of the raw tire 4.

The arithmetic logical unit 38 executes programs such as the preheat routine above. The communication unit 39 is connected to an unillustrated communication network so as to transmit/receive preheat information data such as category data, status data, etc. about the raw tire 4 under preheat processing to/from information processing apparatus such as production management system, etc. connected thereto. The display unit 41 displays preheat information data in a monitor. The data input unit 42 consists of a keyboard, a mouse, and every kind of switches to input preheat information data and operation signals.

Method for preheating raw tires will be described below through operations of the raw tire preheating apparatus of the foregoing configuration.

Raw tire 4 comprising a plurality of layers including a belt member 56 and/or a bead wire 52 therein is manufactured by using an unillustrated tire molding machine through a molding process, as shown in FIG. 4. The raw tire 4 is put into conveyable status with retaining means 1 by upper bead portion 4c and lower bead portion 4c' being retained respectively by upper supporting plate 21 and lower supporting plate 22 of the retaining means 1, as shown in FIG. 1. Then, the raw tire 4 is conveyed to a storing process with being kept inflated, in case there is provided a waiting period until the vulcanization molding of the raw tire 4.

Information processing unit 36 of preheat controlling apparatus 30 operates on a functioning based on the preheat routine in the storing process. Therefore, a carry-in processing for the conveyed raw tire 4 into the storing process is executed firstly. That is, tire set means 3 is connected to supporting axis 23 of the retaining means 1 so that the conveyed raw tire 4 is to be retained. Then, rotational axis 24 is moved horizontally to be positioned over tire rotation means 2 after the raw tire 4 is set in a horizontal attitude, and subsequently the raw tire 4 is brought down accompanied with the retaining means 1 so as to be set on the preheating position by the tire rotation means 2 being fitted with the rotational axis 24 (S1).

Next, a data input processing is executed to be an input wait state for every kind of preheat information data such as category data of the raw tire 4 set on the preheating position, etc. Then, preheat information data, which are input with keystrokes on the keyboard etc. of data input unit 42 by an operator, is stored in memory unit 40 (S2). Afterward, tire rotation drive unit 34 is operated and the raw tire 4 is rotated in one direction by the tire rotation means 2 (S3).

In addition, after the preheat information data is input, a match processing between category data extracted from the preheat information data and data on the preheat configuration table is executed to specify corresponding preheat configuration to the category data. It is recognized that raw tires of the category should be preheated by both radiation heating and induction heating if the first preheat configuration is specified as a result of the match processing, while should be preheated by only radiation heating if the second preheat configuration.

Then, the raw tire 4 is judged to, or not to, belong to the first preheat configuration category (S4). If the raw tire 4 is judged to belong to the first preheat configuration category (YES in S4), induction heating power supply unit 31 is operated. As a result, induction power is supplied from the induction heating power supply unit 31 to coil 12 of induction heating means 11, and strong magnetic field is applied on the tread portion 4a of the raw tire 4 so that the belt member 56 of the tread portion 4a is heated inductively. Accordingly, the center of notably fleshier part of the tread portion 4a of the raw tire 4 is mainly heated from the inner side as well as the tread portion 4a is heated circumferentially by rotating the raw tire 4 (S5).

Subsequently, heater power supply unit 33 is operated and heater power is supplied for the first to the fourth radiation heaters 15a to 15d. Then, each of the radiation heaters generates heat respectively with each amount of energy according to the heater power to generate heat rays from heater lamp 17. The most part of the heat rays proceeds toward the raw tire 4 by being reflected on reflecting plate 18. Heat rays, which followed the foregoing path, reach the upper bead portion 4c, the upper end of the tread portion 4a, the lower end of the tread portion 4a, and the lower bead portion 4c' of the raw tire 4 respectively and heat the portions from the surface side (S6).

On the contrary, if it is recognized that the raw tire 4 belongs to the second preheat configuration category, that is, a category for passenger vehicles and/or light trucks with relatively thin rubber thickness (NO in S4), the S6 is executed to heat each portion of 4c, 4a and 4c' only radiatively by the first to the fourth radiation heaters 15a to 15d without being heated inductively (S6).

Preheating temperature controlling processing is executed once heating (preheating) of the raw tire 4 is started as described above. That is, the first to the fifth temperature sensors 16a to 16e detect the preheating temperature of each portion of 4c, 4a and 4c' and send outputs to temperature input unit 32 as preheating temperature signals indicated by voltage value or current value. The temperature input unit 32 takes in a preheating temperature signal corresponding to the selection signal of the information processing unit 36 from among preheating temperature signals output from the first to the fifth temperature sensors 16a to 16e, and then, converts the selected preheating temperature signal (analog signal) into digital signal, and sends output to the information processing unit 36. The information processing unit 36 acquires the preheating temperature of each portion of 4c, 4a and 4c' through the preheating temperature signal by switching selection signals sequentially. Then, the heater power supply unit 33 is controlled by, for example, ON/OFF control or PID control etc. so that the preheating temperature of each portion of 4c, 4a and 4c' becomes predetermined temperature. If the raw tire 4 is heated inductively as well as radiatively, the induction heating power supply unit 31 is also controlled by every kind of controls such as mentioned above. As a result, no temperature drop of the raw tire 4 occurs even if the raw tire 4 is stored in a room-temperature environment. Further, the temperature of the whole part of the raw tire 4 may be raised neat to the vulcanization temperature according to the degree of radiation heating and/or induction heating (S7).

If the raw tire 4, preheated as described above, is subsequently conveyed to a vulcanizing process following the storing process, the first to the fourth radiation heaters 15a to 15d and the first to the fourth temperature sensors 16a to 16d are moved to a position in readiness with heater support 14 being rolled back after radiation heating and/or induction heating are halted. Then, the raw tire 4 in released status is drawn upward by the tire set means 3 via the supporting axis 23, and is transferred to the vulcanizing process for vulcanization molding to be an end product. The vulcanization molding of the raw tire 4 may be completed by raising the temperature of the whole part of the raw tire 4 to the vulcanization temperature in a short time even if the raw tire 4 is transferred to the vulcanizing process with shorter preheating time because the temperature of the whole part of the raw tire 4 is raised to predetermined temperature by means of both radiation heating and induction heating in a short time (S8).

Next, the following test was conducted to recognize effects of the raw tire preheating method and apparatus according the present embodiments.

Figure 6:
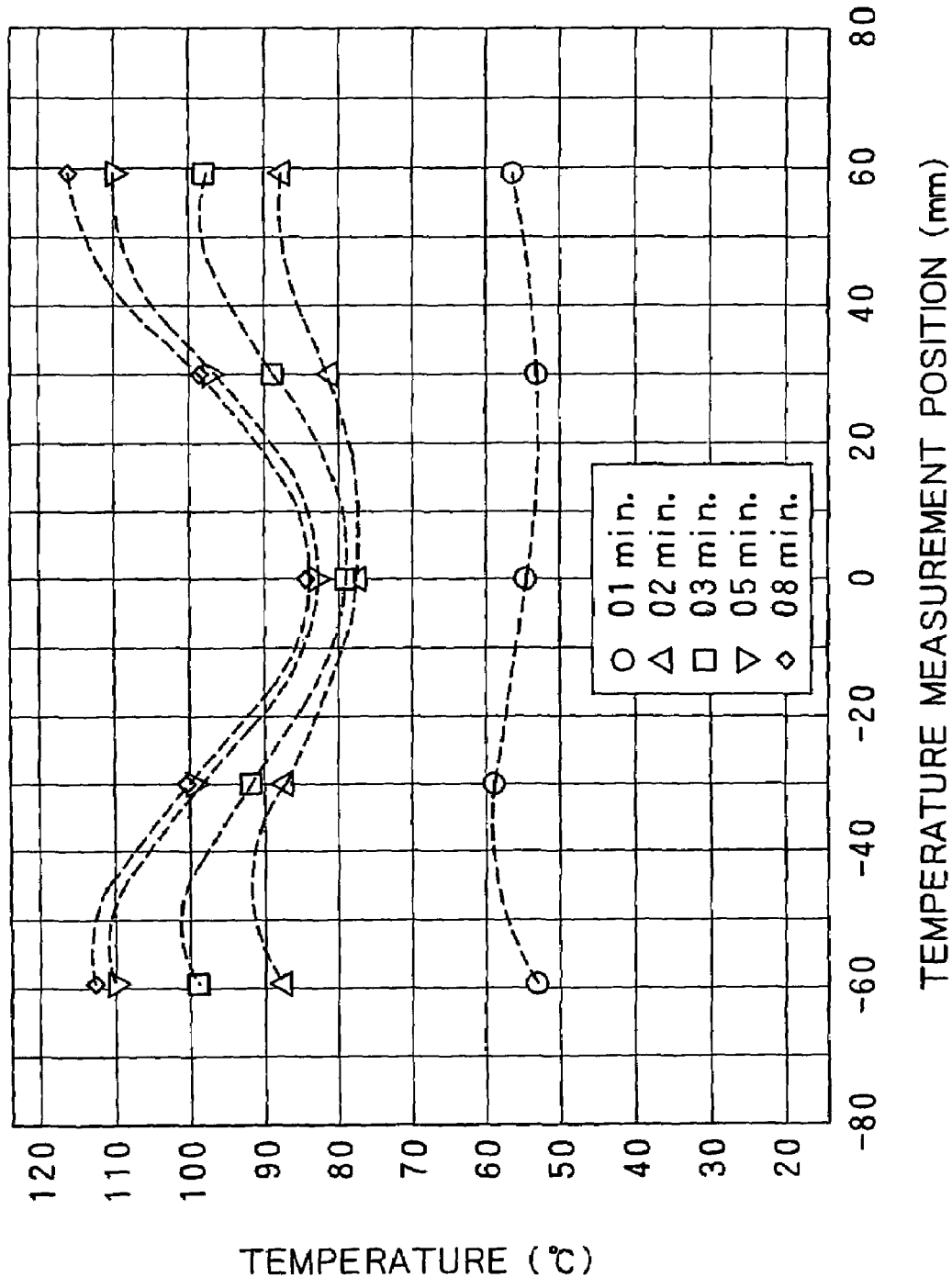
FIG. 6 is a graph showing a relationship between temperature measurement position on a raw tire and temperature under heating by using both induction heating and radiation heating.

That is, a plurality of thermocouples are embedded at the upper end portion, the middle portion and the lower end portion as well as the upper middle portion and the lower middle portion, both of which were between former portions, in the tread portion 4a of raw tire 4. Then, each of the thermocouples 45 was connected to temperature detection apparatus to be measurable. And then, the raw tire 4 above was installed in a raw tire preheating apparatus, and was preheated by both radiation heating and induction heating by operating the second and the third radiation heaters 15b and 15c as well as operating induction heating means 11. Temperature of each portion was measured at elapsed time of 1, 2, 3, 5, and 8 min, and temperature of each portion under only induction heating by the induction heating means 11 was also measured at the same elapsed time for comparison. As a result of the measurement, it was made clear as shown in FIG. 6 that the temperatures of the upper end and the lower end of the raw tire 4 were raised with the same heat-up rate as the other portions or more if heated by using both radiation heating and induction heating.

Figure 7:
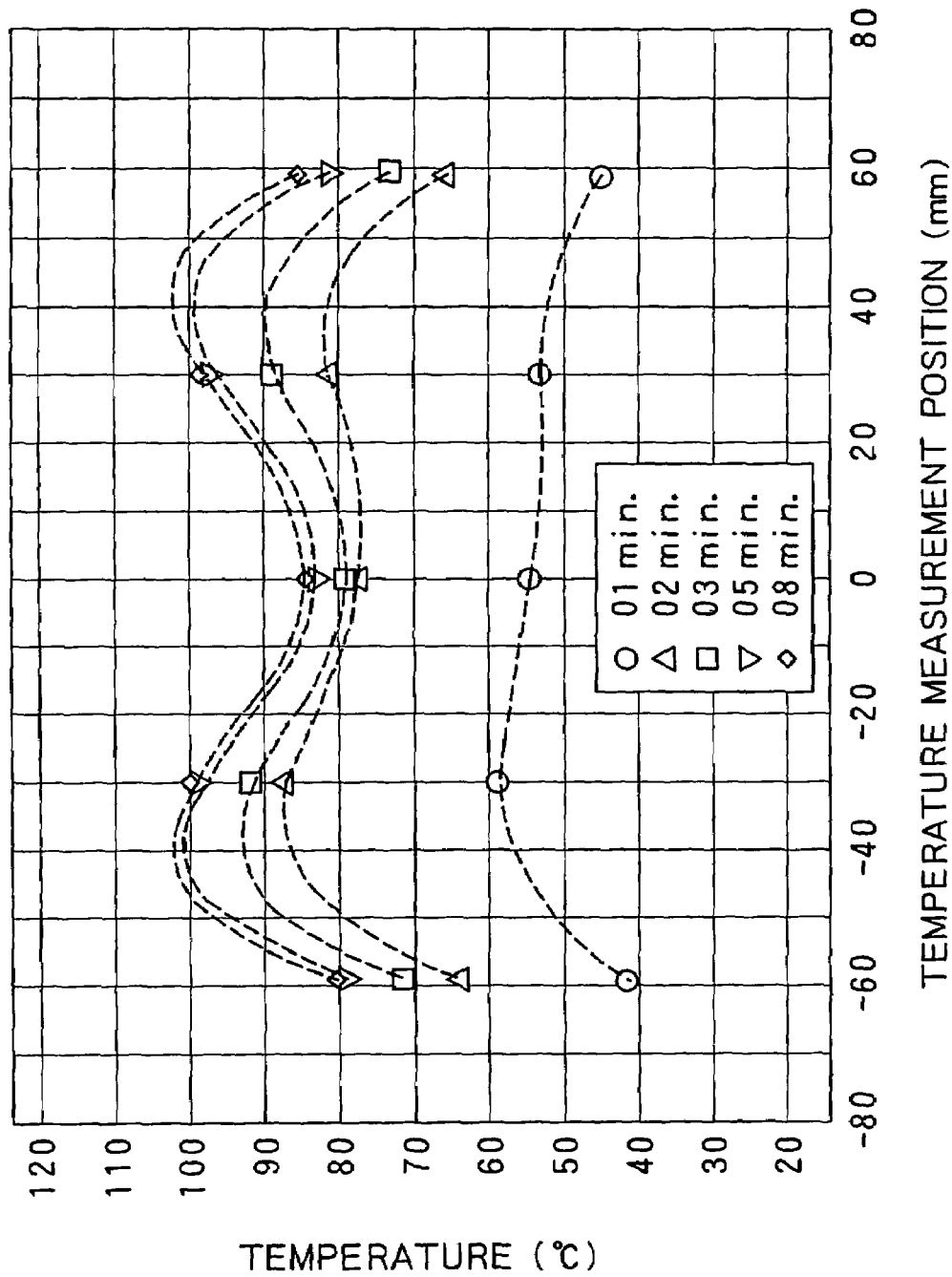
FIG. 7 is a graph showing a relationship between temperature measurement position on a raw tire and temperature under heating by using only induction heating.

In addition, temperature change of both bead wire 52 and rate-limiting portion (end portions of the tread portion 4a) under only induction heating by the induction heating means 11 of FIG. 1 were measured. As a result of the measurement, it was made cleared as shown in FIG. 7 that that the temperatures of the upper end and the lower end of the raw tire 4 were raised with smaller heat-up rate than the other portions.

Figure 8:
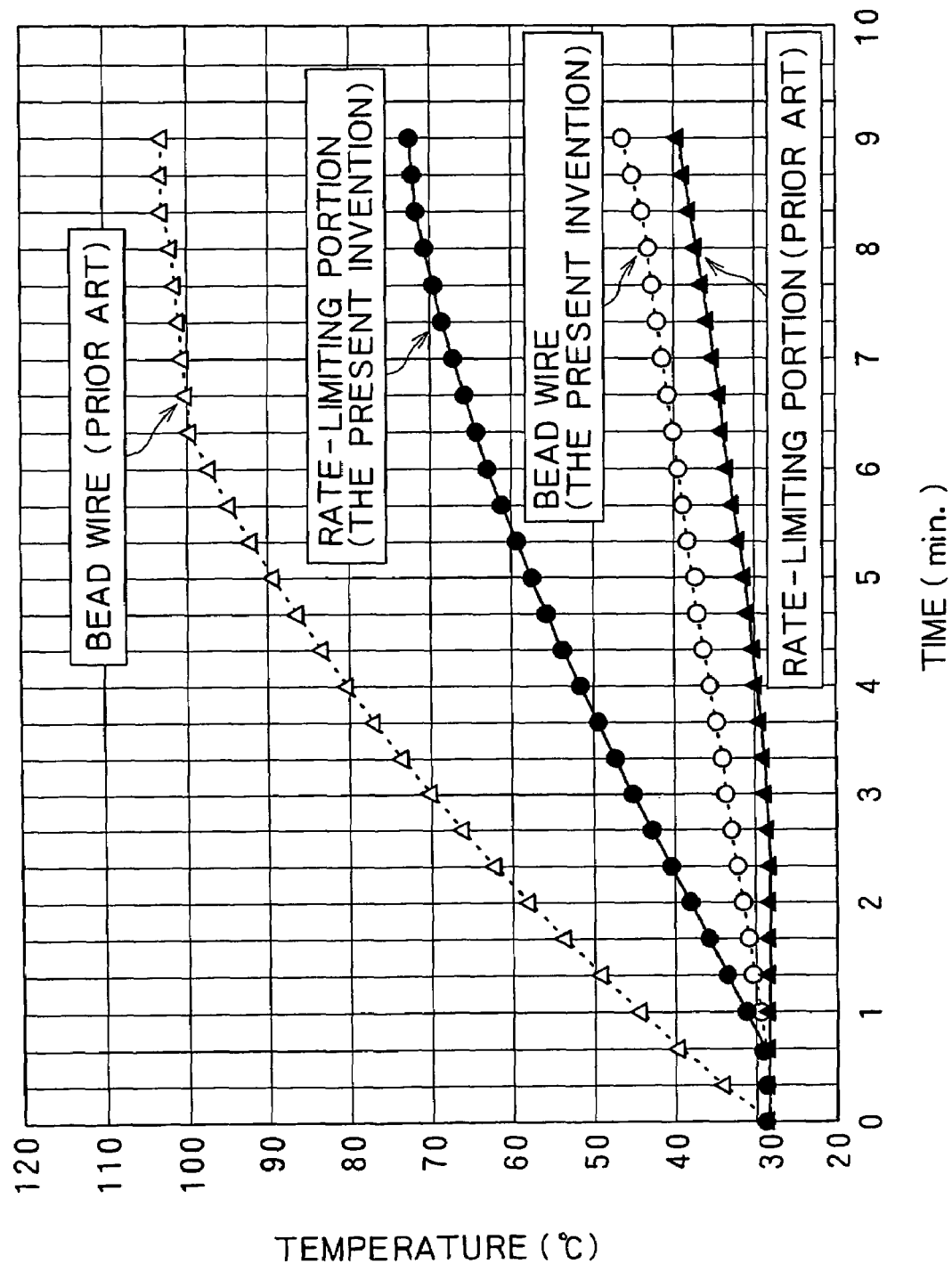
FIG. 8 is a graph showing temperature changes of bead wires and rate-limiting portions.
Figure 9:
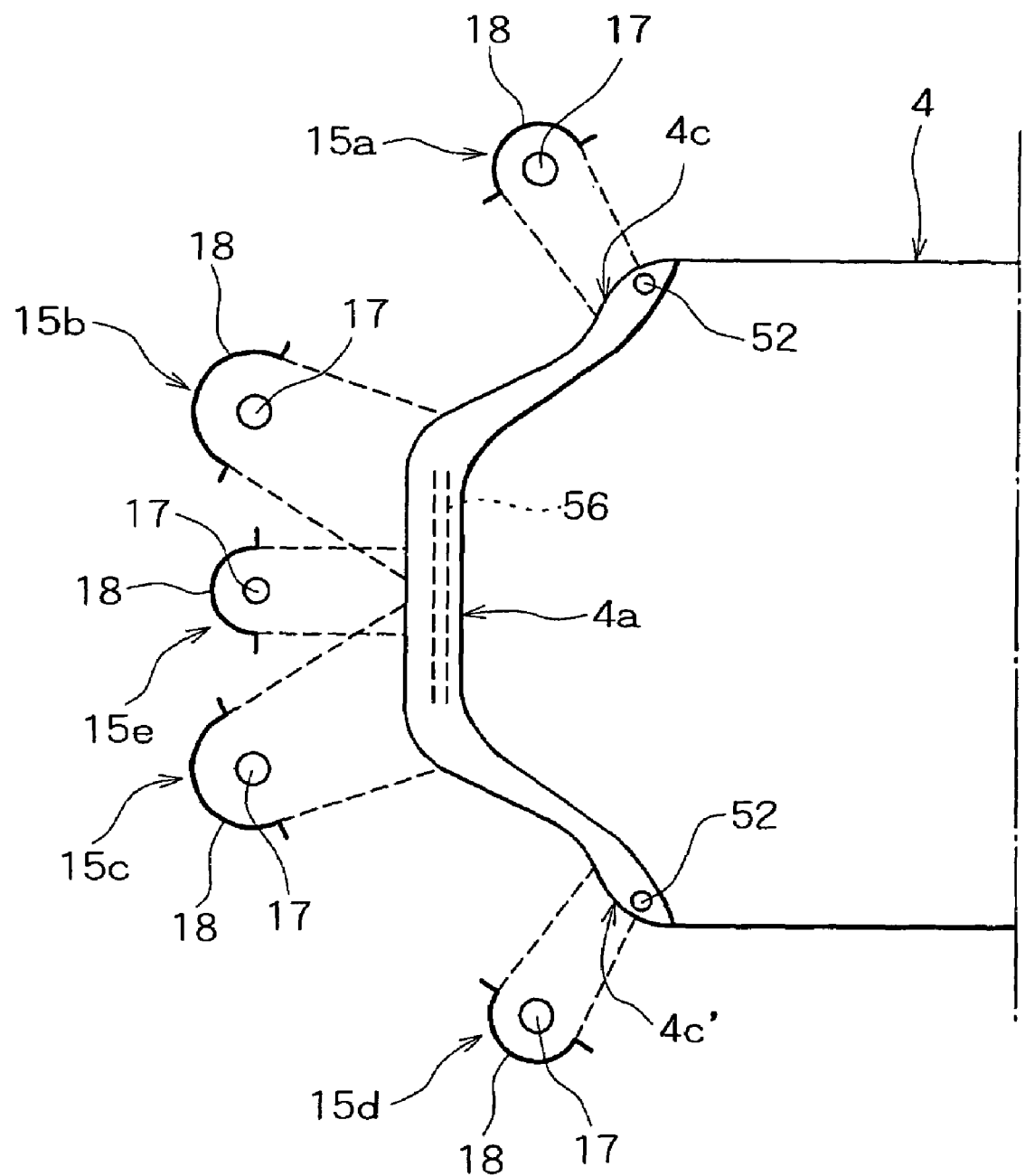
FIG. 9 is another schematic diagram illustrating the arrangement condition of radiation heaters.

Then, temperature change of both the bead wire 52 and the rate-limiting portion (the end portions of the tread portion 4a) under radiation heating by the first to the fourth radiation heaters 15a to 15d of FIG. 1 were measured, the result of the measurement being plotted in FIG. 8 as "The present invention". Temperature change of both the bead wire 52 and the rate-limiting portion (the end portions of the tread portion 4a) under induction heating for the bead wire 52 were measured, the result of the measurement being plotted in FIG. 8 as "Prior art". As a result, it is made cleat that the heat-up rate of the rate-limiting portion is higher than that of the bead wire 52 under radiation heating environment of "The present invention", while extremely lower under only induction heating environment of "Prior art".

As described above, the raw tire preheating method according to the present embodiment is a method as shown in FIG. 1 for preheating raw tire 4 including metal members such as belt member 56, bead wire 52 etc. embedded therein, comprising preheating by using both induction heating for the metal members, and radiation heating for a rate-limiting portion, the temperature of the rate-limiting portion rising slowly under only the induction heating. In addition to above, the metal members may be other than the belt member 56 or the bead wire 52. Further, the rate-limiting portion of the present embodiment is to be considered in all aspects as illustrative of the portion where temperature rises slowly under only induction heating environment, and not limited to end portions of tread portion 4a as illustrated.

In accordance with the method above, regions, in which the metal members embedded, are heated from the inside by induction heating for the metal members. Also, the rate-limiting portion, the temperature of which rises slowly under only the induction heating environment, is heated from the surface side by radiation heating. By virtue of induction and radiation heating process above, each portion of the raw tire 4 may be heated up to desirable temperature rapidly and certainly. Therefore, each portion of the raw tire 4 may be heated up to desirable preheating temperature, and then the whole portion of the raw tire 4 may be heated up to the vulcanizing start temperature in a short time in the vulcanization molding process, resulting in that the vulcanization molding process may be completed in a short time.

Particularly, the raw tire preheating method according to the present embodiment is a method for preheating raw tire 4 including belt member 56 embedded in tread portion 4a, comprising preheating by using both induction heating for the belt member 56, and radiation heating for end portions of the tread portion 4a. In accordance with this method, typically configured raw tires may be sufficiently preheated.

More particularly, the raw tire preheating method according to the present embodiment is a method for preheating raw tire 4 including the member 56 and bead wire 52 embedded in tread portion 4a, comprising preheating by using both induction heating for the belt member 56 in the tread portion 4a, and radiation heating for end portions of the tread portion 4a and the bead portions 4c and 4c'. In accordance with this method, typically configured raw tires may be sufficiently preheated. Further, an apparatus for embodying the raw tire preheating method may be acquired inexpensively because it is not necessary to install an expensive apparatus for induction heating to heat the bead portions 4c and 4c'.

Also, the raw tire preheating method above may be embodied in the raw tire preheating apparatus according to the present embodiment. That is, the raw tire preheating apparatus is an apparatus for preheating raw tire 4 including metal members such as belt member 56, bead wire 52 etc. embedded therein, comprising retaining means 1 for retaining the raw tire 4 in a predetermined attitude in a releasable manner; induction heating means 11 for heating the metal members inductively by means of a high frequency magnetic field, the high frequency magnetic field being applied to the raw tire 4 retained by the retaining means 1; and the first to the fourth radiation heaters 15a to 15d for heating rate-limiting portion radiatively, the temperature of the rate-limiting portion rising slowly under only induction heating for the metal members.

In accordance with the configuration of the raw tire preheating apparatus above, regions, in which the metal members embedded, are heated from the inside by induction heating for the metal members. Also, the rate-limiting portion, the temperature of which rises slowly under only the induction heating environment, is heated from the surface side by radiation heating. By virtue of induction and radiation heating process above, each portion of the raw tire 4 may be heated up to desirable temperature rapidly and certainly. Therefore, each portion of the raw tire 4 may be heated up to desirable preheating temperature, and then the whole portion of the raw tire 4 may be heated up to the vulcanizing start temperature in a short time in the vulcanization molding process, resulting in that the vulcanization molding process may be completed in a short time.

Further, the raw tire preheating apparatus according to the present embodiment is an apparatus, wherein belt member 56 (metal member) is embedded in tread portion 4a, while the first to the fourth radiation heaters 15a to 15d being arranged to heat end portions of the tread portion 4a and bead portions 4c and 4c' as a rate-limiting portion. In accordance with this configuration, typically configured raw tires may be sufficiently preheated. In addition to above, raw tire preheating apparatus may be acquired inexpensively because it is not necessary to install an expensive apparatus for induction heating to heat the bead portions 4c and 4c'.

Furthermore, the raw tire preheating apparatus according to the present embodiment comprises tire rotation means 2 for rotating the raw tire retained by the retaining means 1 circumferentially. In accordance with this configuration, the whole portion of the raw tire 4 may be preheated equally.

The present invention, having been described above with preferred embodiments, may be embodied in other specific forms than described above without departing from the spirit or essential characteristics thereof. That is, the raw tire preheating apparatus may comprise the fifth radiation heater 15*e* arranged to heat middle portion of tread portion 4*a* radiatively as well as the first to the fourth radiation heaters 15*a* to 15*d*. The tread portion 4*a* may be heated more effectively with the fifth radiation heater 15*e*.

The first to the fourth radiation heaters 15*a* to 15*d* may be arranged inside raw tire 4 as shown in FIG. 10 as not limited only to the present embodiment, wherein the heaters are arranged outside the raw tire 4, resulting in that the raw tire preheating apparatus may be miniaturized. Further, the first to the fourth radiation heaters 15*a* to 15*d* may be formed to be rounded along raw tire 4 circumferentially as not limited only to the present embodiment, wherein the heaters are formed to be straight columnar, resulting in that heat rays may be applied efficiently on each part of the raw tire 4. In addition to above, coil 12 is to be considered as not limited only to the present embodiment, wherein the coil 12 is formed to have a curvature that matches a segment of the tread portion 4*a* of the raw tire 4.

What is claimed is:

1. A raw tire preheating method for preheating a raw tire including metal members embedded therein, comprising:

retaining said raw tire in a predetermined attitude in a releasable manner with retaining means;

preheating said metal members inductively by means of a high frequency magnetic field induction heating means;

employing a plurality of radiation heaters to simultaneously transmit radiative heat towards at least two portions of the raw tire embedded with one of said metal members and at least another two portions of the raw tire embedded with another one of said metal members, said at least two portions and said at least another two portions being induced to generate heat lower than other portions of the raw tire embedded with said one of said metal members so as to heat said raw tire evenly, said at least two portions being end portions of a tread portion of the raw tire and said at least another two portions being bead portions of the raw tire; and coordinating with a controller said induction heating means and said radiation heaters to heat said raw tire evenly.

2. A raw tire preheating apparatus for preheating a raw tire including metal members embedded therein, comprising:

(a) a retaining means for retaining said raw tire in a predetermined attitude in a releasable manner;

(b) an induction heating means for heating said metal members inductively by means of a high frequency magnetic field, said high frequency magnetic field being applied to said raw tire retained by said retaining means;

(c) a plurality of radiation heaters targeting towards at least two portions of the raw tire embedded with one of said metal members and at least another two portions of the raw tire embedded with another one of said metal members, said at least two portions and said at least another two portions being induced by said induction heating means to generate heat lower than other portions of the raw tire embedded with said one of said metal members and said another one of said metal members so as to heat said raw tire evenly, said at least two portions being end portions of a tread portion of the raw tire and said at least another two portions being bead portions of the raw tire; and (d) a controller for coordinating said induction heating means and said radiation heater to heat said raw tire evenly.

3. The raw tire preheating apparatus according to claim 2, comprising a tire rotation means for rotating the raw tire retained by said retaining means circumferentially.

4. The raw tire preheating apparatus according to claim 2, wherein one of said metal members is embedded in said tread portion, while an additional radiation heater is arranged to heat a central portion of said tread portion.

5. The raw tire preheating method according to claim 1, further comprising rotating the raw tire retained by said retaining means circumferentially.

6. The raw tire preheating method according to claim 1, wherein one of said metal members is embedded in said tread portion, while an additional radiation heater is arranged to heat a central portion of said tread portion.

* * * * *